Aug. 18, 1925.
H. HOLLAND
1,550,167
TROLLEY WHEEL
Filed Aug. 21, 1922   2 Sheets-Sheet 1
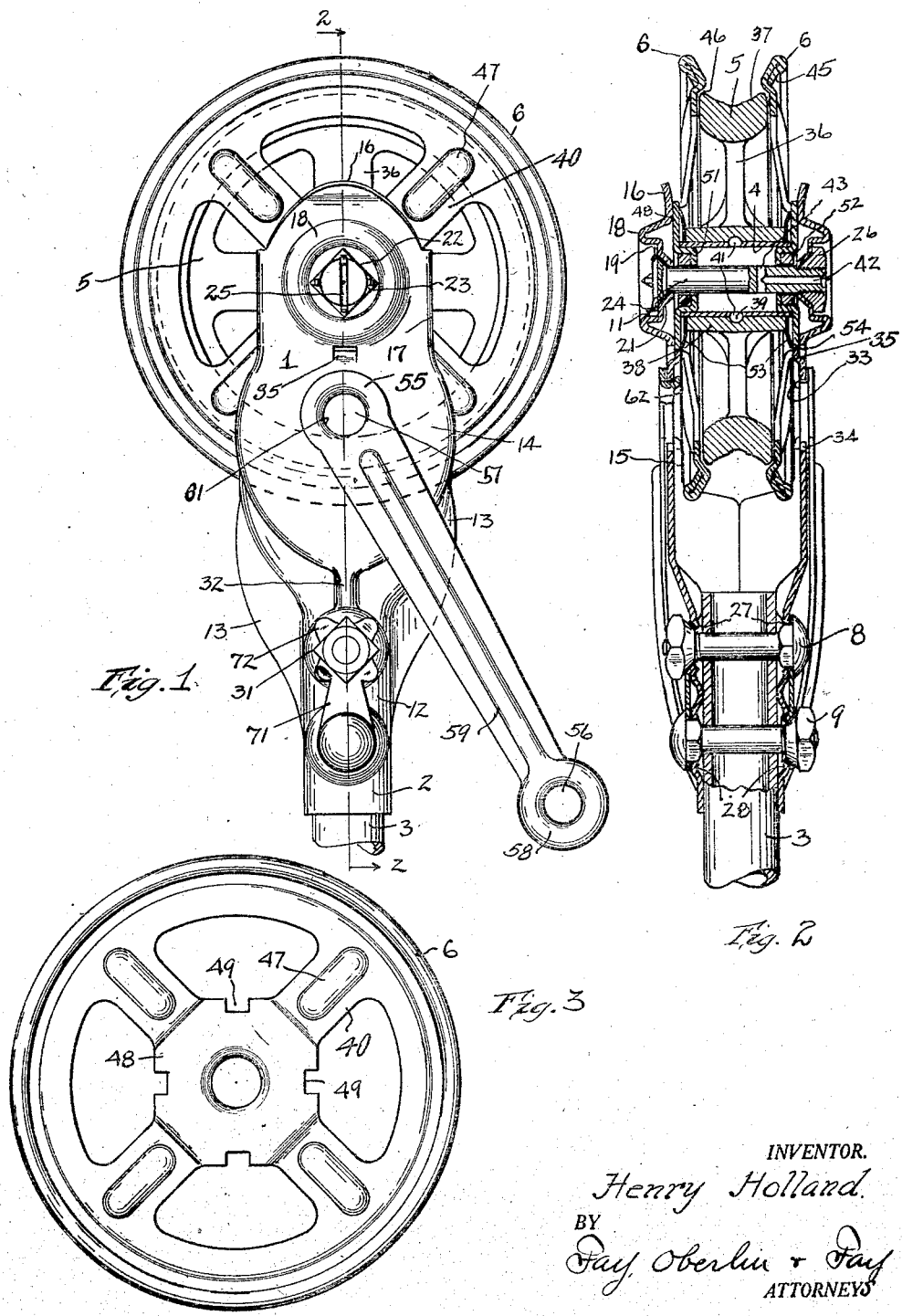
INVENTOR.
Henry Holland.
BY
Fay, Oberlin + Fay
ATTORNEYS Patented Aug. 18, 1925.

1,550,167

UNITED STATES PATENT OFFICE.

HENRY HOLLAND, OF CLEVELAND, OHIO.

TROLLEY WHEEL.

Application filed August 21, 1922. Serial No. 583,078.

*To all whom it may concern:*

Be it known that I, HENRY HOLLAND, a citizen of the United States, and a resident of Cleveland, county of Cuyahoga, and State of Ohio, have invented a new and useful Improvement in Trolley Wheels, of which the following is a specification, the principle of the invention being herein explained, and the best mode in which I have contemplated applying that principle so as to distinguish it from other inventions.

This invention relates to an improved form of trolley wheel and accessory structure. More particularly it comprises a wheel supported in a novel manner in a harp of special design and having disc flanges capable of being readily adjusted to a variety of positions to compensate for wear and thus prolong the period of usefulness of the appliance. It also embodies an auxiliary current collector to insure adequate current supply to the car under all conditions, particularly at high speeds.

In devices of this character as heretofore constructed, fixed guides, or flanges formed integrally with the harp and concentric with the trolley wheel proper and of greater diameter than said wheel, have been most commonly used. These guides while reversible would not equal the life of the trolley wheel which would have to be reconstructed or discarded before it had rendered its full term of service. Another expedient has been to supply rotatable guide discs at the sides of the trolley wheel. Such discs, however, have a tendency to climb off the wire.

The object of my invention is to improve devices of this character in respect to numerous details of their construction. A further object of my invention is to supply a trolley wheel which is capable of supplying adequate current under high speed conditions and which has flanges capable of a large number of successive adjustments to allow for wear and at the same time simplify the constructional features of the device so as to permit rapid and economical manufacture and easy assemblage and renewal of the parts. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 4:
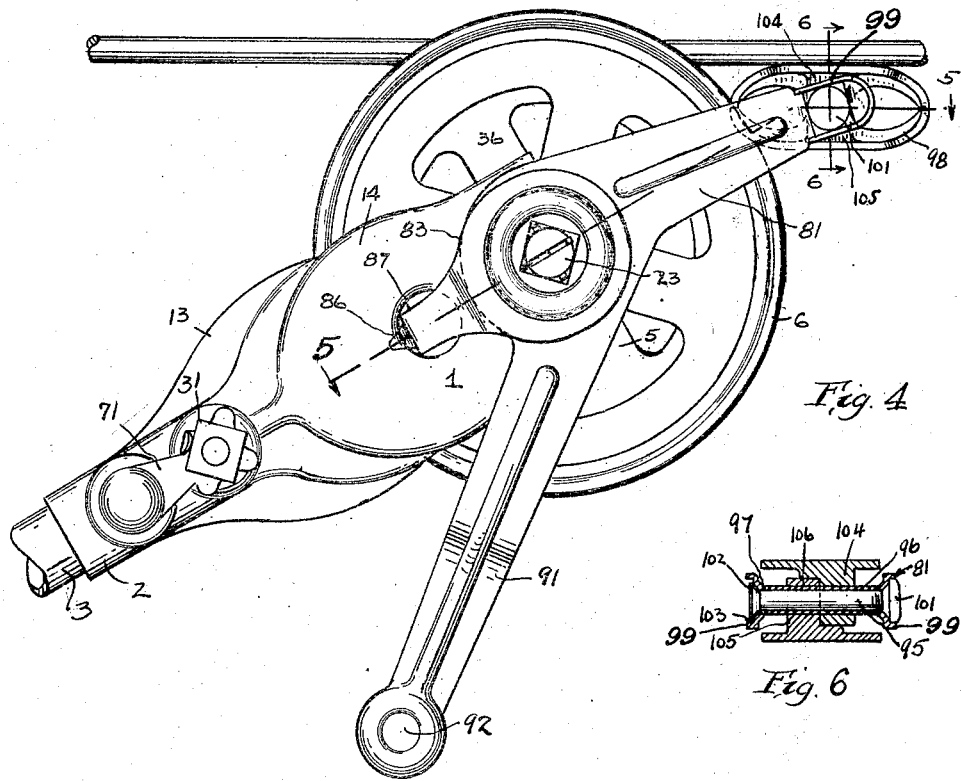
Figure 6:
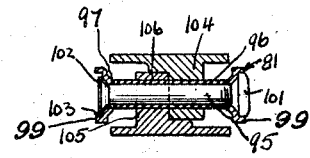
Figure 5:
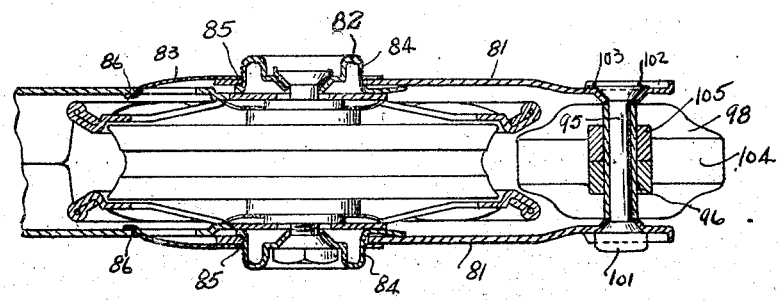

Fig. 1 is a side elevation of my improved trolley wheel and accessory structure; Fig. 2 is a vertical sectional view of what is shown in Fig. 1, taken along the line 2—2 looking in the direction of the arrows; Fig. 3 is a view of the outer face of one of the guide discs; Fig. 4 is a side elevation of a modified form of my trolley wheel and its accessory structure, particularly showing the follower shoe in operative position upon a wire; Fig. 5 is a part sectional view, taken along the line 5—5 shown in Fig. 4, looking in the direction of the arrows; and Fig. 6 is a sectional detail view of the follower shoe taken along the line 6—6 shown in Fig. 5.

As is clearly shown in the drawing, the device comprises a harp 1 having a socket 2 for engagement with the trolley pole 3 at its lower end, and a tubular axle 4 for supporting the trolley wheel 5 flanked by a pair of guide discs 6, 6, at its upper end. The harp is preferably made of metal stampings of identical and interchangeable design and adapted, when assembled, to present an outline corresponding to a trolley harp formed as an integral member, the two sections abutting along a median line and being held in accurate registry with each other by means of a pair of bolts 8, 9, extending transversely through the upper end of the trolley pole and the lower ends of the harp sections, as well as by means of the bolt 11, extending through the upper end of such harp sections centrally of the tubular axle hereinafter described in detail.

Each harp section, it will be noted, is formed of cold rolled drawn sheet steel blanks, heat treated and sherardized to suitable hardness to prevent wear. The harp sections after being shaped have their lower ends 12 bent to semi-cylindrical form to receive the trolley pole and have lateral webs 13, merging with the outwardly pressed main body portion 14 of the harp. Flanges 15 of shallow depth extend from a point approximately at the mid-length of the stamping to a point at its upper end at which the supporting elements for the guide discs and the axle-securing bolt are located. The extreme upper edge 16 of the stamping presents a plain unflanged surface. The upper portions 17 of these shallow flanges 15 are adapted to engage and interlock with certain of the octagonal flanges formed upon the adjacent guide discs hereinafter to be described.

The support for the discs and axle-supporting bolt formed at the upper end of each harp section, comprises an outwardly pressed circular member or boss 18, bent inwardly at its central portion 19 and provided with a circular bearing 21 of a size suitable to receive the axle bolt. Concentric with the bearing for said bolt, a seat 22 of square outline is impressed in the metal to receive a bolt locking element comprising a square shaped metal element 23 having four upstanding fingers 24 adapted to be pressed downwardly into locking relation with the slot 25 formed in the head of the axle-supporting bolt, and in the other of said harp sections, said seat is adapted to non-rotatively hold the square nut 26 for said bolt.

The lower semi-cylindrical portion of the stamping is provided with a pair of longitudinally alined apertures 27, 28, adapted to receive the bolts 8, 9, extending through the upper end of the trolley pole. These bolt holes are preferably reinforced by forming annular ribs or bosses 31, of pressed metal, about their edges and the upper of said bolt holes is connected by a round rib 32 with the plain face of the main body portion of the stamping. Centrally of the main body portion of the stamping in alignment with the holes for the axle-securing bolt and the bolt holes of the semi-cylindrical portion, an aperture 33 of substantially circular outline is formed, the lower central edge thereof having a notched portion 34 for a purpose hereinafter to be disclosed. Immediately above said aperture 33 a short broad tongue of metal 35 is pressed inwardly to lock with notches in the guide discs.

As hereinbefore stated, the trolley wheel 5 is supported centrally upon a tubular axle and of relatively large diameter carried between the upper ends of the harp. The trolley wheel is preferably a heavy brass wheel, having a plurality of spokes 36, four being shown in the drawing. The trolley wheel has a grooved outer circumferential portion 37 of a curvature suitable to ride effectively upon a trolly wire. The hub portion 38 of said wheel is preferably formed with two outer bearing surfaces, the central portion of the hub sleeve being cut away so as to form a lubricating chamber 39 of small diameter. The large tubular axle of the trolley wheel is perforated centrally by a plurality of oil or grease holes 41 through which grease may be distributed from its interior to the bearing surfaces of said wheel and axle. The axle-securing bolt has a central bore 42 extending inwardly from one end and has communicating lateral orifices 43 whereby lubricating material may be supplied to the interior of said tubular axle.

Adjacent to each side of the trolley wheel the guide discs 6 are positioned. These discs are of a diameter somewhat larger than the diameter of the trolley wheel and are preferably formed of stamped metal. In practice it is found that by stamping the guide discs from cold drawn sheet steel plates, and then heat treating and sherardizing them, a product is obtained which is peculiarly adapted for serving the purpose of a guide flange on high speed trolley cars.

As is clearly shown in Fig. 1, the discs on each side of the trolley wheel are exact counterparts of each other, comprising circular sheet metal blanks having their outer circumferential portions bent inwardly upon themselves so as to form a reinforced flange 45. The overlapped portion of the disc is given an outward inclination throughout the circumference of said disc and adjacent to the edge of said overlapped portion the body of the disc is forced outwardly so as to present a depressed inner face 46 of a size slightly larger than the trolley wheel and thus serve to allow said angularly disposed peripheral portions of the guide disc members to overhang the edges of the trolley wheel and present, with the groove in the trolley wheel, a channel for the reception of the trolley wire. This construction effectively prevents the trolley wire from being forced beween the trolley wheel and either guide disc.

The guide discs are preferably formed with a plurality of spokes 40 having outwardly pressed reinforcing ribs 47 and with outwardly pressed hub portions 48 preferably of octagonal outline. Between the spokes said octagonal portions have notches 49, formed in their edges, to receive the tongues 35 pressed inwardly from the body of the harp sections. These tongues 35 and the flanges 17 of the harp securely hold the guide discs against rotation. The central portion of the hub sections of the guide discs are pressed inwardly to form substantially circular bosses 51 of a size to fit snugly within the ends of the tubular axle hereinbefore referred to. To reinforce the bosses and at the same time provide adequate bearing surface for supporting the discs upon the axle bolt, small metal plates 52 approximately square in outline and having central bearings of a size to accommodate the axle bolt are pressed into position within the axle bosses and held by frictional engagement with the sides of said bosses. Washers 53 of brass or copper or other suitable metal to form proper electrical contact with the hub of the trolley wheel, hereinabove referred to, are adapted to be placed over the bosses. These washers are preferably sheet metal discs formed with a central orifice of a size to fit loosely over the bosses on the guide discs and having four extension members or prongs 54 to contact with the hubs of said guide discs between the spokes thereof.

As a convenient means for attaching the trolley rope to the construction, I provide a pair of pressed metal arms 55 having apertures 56, 57, at their respective ends. The lower aperture 56 is intended for the reception of the trolley rope. Surrounding said aperture the arm is pressed upwardly to form a reinforcing edge 58 and such upwardly pressed portion is extended as a reinforcing rib 59 longitudinally of said arm to a point closely adjacent to the aperture at the upper end thereof. Said upper aperture 57 is formed by pressing the adjacent metal downwardly to form an inwardly extending flange 61 of which a portion is cut away upon each side so as to provide two extension tongues 62, whereby said arms may be attached to the main body portion of the harp. As is clearly shown in Fig. 2, the flange is provided with projections 62 which, when positioned in longitudinal alignment in the central body portion, may be engaged with the aperture 33 therein. This adjustment is permitted by the notch 34 formed at the lower edge of said aperture, as heretofore described, which is of a size sufficient to accommodate the bent-over projection or tongue 62 of the flange after its opposite projection is engaged beneath the plate on the opposite side thereof. By turning the arm to either side, the projections are brought over the circular portion of the central aperture and serve to hold the arms locked to the plates of the respective portions of the harp. The trolley rope is then secured through the lower apertures 56 in said arms, which arms are then prevented from moving to a position in longitudinal alignment with the harp from which position alone they can be released from engagement with said structure. As is clearly shown in Fig. 2, the arms are curved toward each other at their lower ends and keep the trolley wheel from striking the top of the wire and fouling the spanning wires when wedged in this manner at high speed.

As has been indicated, the upper bearings upon the harp sections are adapted to receive the axle bolt and hold the same in locked position. This is accomplished by seating a square headed nut 26 in the squared countersunk portion of the harp sections adjacent the axle bolt bearings and screwing the bolt into such nut by means of the slot 25 provided in said bolt head. When the right degree of adjustment has been attained, the locking fingers 24 upon the squared nut lock washer, hereinbefore referred to, are bent downwardly to engage the opposite portions of said slot, thus securely preventing any releasing movement on the part of said bolt.

It will be noted that a nut lock of special design is provided for the bolts 8, 9, attaching the harp to the upper end of the trolley pole. These nut locks comprise shaped metal plates 71 of a length sufficient to engage over the shank of the adjacent bolt and having their opposite ends provided with four triangular fingers 72 adapted to be turned upwardly against the side edges of a nut screwed to said bolt.

The operation and assembly of the construction will be obvious from the description heretofore given. It should be stated, however, that the guide discs, particularly those used on high speed interurban cars, have a life of much shorter duration than the trolley wheel itself and therefore, after a certain mileage has been recorded for said trolley wheel, or when inspection of the same discloses a large degree of wear, it will be found necessary to unfasten the main axle bolt and partially unscrew the trolley engaging bolts and spread the respective harp sections so that the shallow flanges 17 and depressed tongues 35 engaging the octagonal faces and notches upon the hub portions of the guide discs may be released from locking engagement therewith. The discs should then be rotated to bring the adjacent octagonal faces and notches into registry with said shallow flanges and tongues and the bolts restored to their former adjustment. Thus, it will be noted, four different adjustments of the guide discs are permitted by the construction described, after which the guide discs may be renewed should the other parts of the apparatus indicate that the device is adequate for still further service.

In connection with either form of my construction there may be added the auxiliary current collector illustrated in Figs. 4, 5 and 6. This collector is intended especially for use with high speed suburban trolley cars and insures an adequate amount of uninterrupted current under all conditions. It comprises a pair of bell crank levers 81 pivoted upon an extension axle bolt or, as shown, fitted over the axle bolt bosses 82 formed at the upper ends of the harp sections. When supported upon said bosses a spring metal plate 83 may be used as a locking device therefor by providing screw threads 84 upon said bosses in a plane slightly above the plane occupied by the bell crank plate. The spring plate has a screw threaded aperture 85 adapted to be engaged over said bosses. When the plate is turned to position, it is locked by placing the lower end 86 thereof in locking engagement with the central aperture 87 provided in the body of the harp sections. The usual trolley rope arms are dispensed with when the bell crank levers are used, the lower ends 91 of said bell crank levers being provided with apertures 92 through which the trolley rope is engaged. The outer ends of said bell crank levers are provided with apertures and depressed flanges 97 forming supports for a pivot bolt 95 and tubular axle 96 upon which are supported the trolley wire engaging shoes 98. Outwardly turned flanges 99 on the side edges of the bell crank levers adjacent the bolt 95 serve on one side to hold the square nut 101 in position and, on the other, to position the bolt locking plate 102, with its upstanding fingers 103, similar to the fastening means 24 for the trolley wheel.

A particular type of shoe has been found most advantageous for use in connection with this apparatus, inasmuch as it comprises complementary elements which may be readily substituted for parts which become unduly worn. These shoe elements, as illustrated in Fig. 6, comprise elongated metal plates 104 of semi-elliptical outline and provided upon their inner surfaces at one side of a median line with upstanding ears 105 of a height somewhat greater than the end portions of said semi-elliptical shaped body. These ears are perforated adjacent their upper ends so as to provide bearings 106 in alignment with ends of said body. It will be noted that by placing two of the semi-elliptical bearing members just described in opposed position, an auxiliary current collector of elliptical shape may be formed and then held in assembled position in the ends of the bell-crank levers, by inserting the supporting bolt through the apertures in the respective ears and duly fastening said bolt into position within the bearings at the ends of said bell-crank levers.

The auxiliary current collecting attachment just described, when in operative position, has its forward end closely adjacent the groove of the trolley wheel, as is shown in Fig. 4. There is at all times, however, sufficient clearance for the shoe to completely revolve on its axle. The device insures adequate contact with the trolley wire under all conditions and in the event of undue vibration of the trolley pole, should the trolley wheel be thrown downwardly, such motion will tend to more strongly press the auxiliary contact upon the trolley wire and the current supply for the car will not be wholly interrupted.

Other modes of applying the principle of my invention may be employed instead of the one explained, change being made as regards the mechanism herein disclosed, provided the means stated by any of the following claims, or the equivalent of such stated means, be employed.

I therefore particularly point out and distinctly claim as my invention:—

1. In a device of the character described, the combination with a support formed in two halves, of a pivot element, a contact member freely revolvable thereon, and a guide member adjacent said contact member and adjustably rotatable about said pivot when said two halves are moved outwardly from their normal position.

2. In a device of the character described, the combination of a trolley harp formed in two halves, a tubular axle supported therein, a trolley wheel rotatably mounted upon said axle, and a pair of guide discs mounted adjacent said wheel and adjustable to a series of different positions relative to said harp when said two halves are moved outwardly from their normal position.

3. In a device of the character described, the combination of a trolley harp, a tubular axle supported therein, a trolley wheel rotatably mounted upon said axle, a pair of guide discs mounted adjacent said wheel, integral faces formed on said guide discs for supporting said tubular axle, and engaging elements upon said guide discs for interlocking relation with elements upon said harp.

4. In a device of the character described, the combination of a trolley harp, a tubular axle supported therein, a trolley wheel rotatably mounted upon said axle, a pair of guide discs mounted adjacent said wheel, integral faces formed on said guide discs for supporting said tubular axle, and angularly disposed faces on the outside of said guide discs for interlocking relation with elements upon said harp.

5. In a device of the character described, the combination of a trolley harp, a trolley wheel and flanking guide discs supported therein, and an auxiliary current collecting member comprising a pair of shoes supported in wire contact position adjacent said trolley wheel.

6. In a device of the character described, the combination of a trolley harp, a trolley wheel supported therein, and an auxiliary current collecting member comprising a pair of shoes supported in wire contact position adjacent said trolley wheel.

7. In a device of the character described, the combination of a trolley harp, a trolley wheel and flanking guide discs supported therein, and a pair of bell crank levers mounted concentrically with said trolley wheel for supporting an auxiliary current collector comprising a pair of shoes in position to contact with the trolley wire immediately adjacent said trolley wheel.

8. In a device of the character described, the combination of a trolley harp, a bearing for a trolley wheel supported transversely of the upper end of said harp, an auxiliary contact supporting member mounted upon said bearing element and an auxiliary current collector, comprising a pair of shoes, supported on said member for contact with the trolley wire adjacent said trolley wheel.

9. In a device of the character described, the combination of a two-part trolley harp comprising complementary sheet metal members provided with a semi-circular channel section adjacent their lower ends, and a deep flanged section adjacent their central body portions and outwardly pressed bosses with inwardly turned axle bolt supporting bearings formed therein and a countersunk locking depression formed adjacent said bearings for said axle bolt.

10. In a device of the character described, the combination of a two-part trolley harp comprising complementary sheet metal members provided with a semi-circular channel section adjacent their lower ends, a deep flanged section adjacent their central body portions and outwardly pressed bosses with inwardly turned axle bolt supporting bearings formed therein, and central apertures provided with notched portions in alignment with the longitudinal diameter of said members for receiving interengaging elements formed upon trolley rope supporting arms.

11. In a device of the character described, the combination of a guide disc for a trolley wheel comprising a sheet metal stamping of circular outline and reinforced at the rim section formed by bending backwardly upon itself the marginal portion of said stamping, said rim section being disposed at an outward angle to the plane of said disc, a depressed central portion adjacent the inner edge of said angularly disposed rim, and an inwardly directed boss formed centrally of said hub section and provided with a bearing for an axle bolt.

12. In a device of the character described, the combination of a guide disc for a trolley wheel comprising a sheet metal stamping of circular outline, an outwardly inclined circumferential portion formed upon said stamping, and an outwardly offset central section provided with a plurality of harp engaging elements.

13. In a device of the character described, the combination of a guide disc for a trolley wheel comprising a sheet metal stamping of circular outline, an outwardly inclined circumferential portion formed upon said stamping, an outwardly offset central section provided with a plurality of harp engaging elements, and a plurality of integrally formed spokes connecting said central and circumferential sections.

14. In a device of the character described, the combination of an auxiliary contact member for a trolley wheel, comprising a pair of bell crank levers adapted to be mounted upon the opposite sides of the axle of said trolley wheel, the lower ends of said levers being bent inwardly to bear against each other, apertures in the end portions of said bell crank levers, those at the lower ends forming means for the attachment of a trolley rope, which holds said levers in lateral alignment, and those at the upper ends thereof forming bearings for supporting an auxiliary contact member, and an auxiliary contact member supported adjacent the upper ends of said bell crank levers.

15. In a device of the character described, the combination of an auxiliary contact member for trolley wheel, comprising a pair of bell crank levers adapted to be mounted upon the opposite sides of the axle of said trolley wheel, apertures in the end portions in the ends of said bell crank levers, those at the lower end forming means for attachment of a trolley rope and those at the upper ends thereof forming bearings for supporting an auxiliary contact member, and an auxiliary contact member comprising a pair of members of semi-elliptical shape having upstanding ears formed at one side of the central portions thereof so as to be adapted to be assembled as an elliptical contact shoe for pivotal movement upon said bell crank levers.

16. In a device of the character described, the combination of a guide disc for a trolley wheel comprising a sheet metal stamping of circular outline, an outwardly inclined circumferential portion formed upon said stamping, and an outwardly off-set part thereon adapted to contact with a portion of the trolley harp to prevent rotation of said guide disc.

17. A trolley wheel harp formed in two sections, each section having means adjacent the upper end thereof adapted to rotatably support a trolley wheel and to non-rotatably support a guide disc, and means adjacent the lower end thereof to secure said sections in operative relation to each other and to the trolley pole.

18. A trolley wheel harp formed of two identically shaped halves assembled in opposite relation to each other, each half comprising a sheet metal stamping provided adjacent one end with means to secure the trolley wheel in operative position and to non-rotatably support a guide disc, and adjacent the other end with means to secure the two sections in operative relation to each other and to the trolley pole.

Signed by me, this 16th day of August, 1922.

HENRY HOLLAND.